May 25, 1926.

N. R. SOLLY

SOLUTION MIXER

Filed Dec. 5, 1924

1,586,336

2 Sheets-Sheet 1

WITNESSES:
Virgil L. Mares
George A. Gunn

INVENTOR
Norwood R. Solly
BY
Joshua R. H. Potts
HIS ATTORNEY

May 25, 1926.
N. R. SOLLY
SOLUTION MIXER
Filed Dec. 5, 1924
1,586,336
2 Sheets-Sheet 2
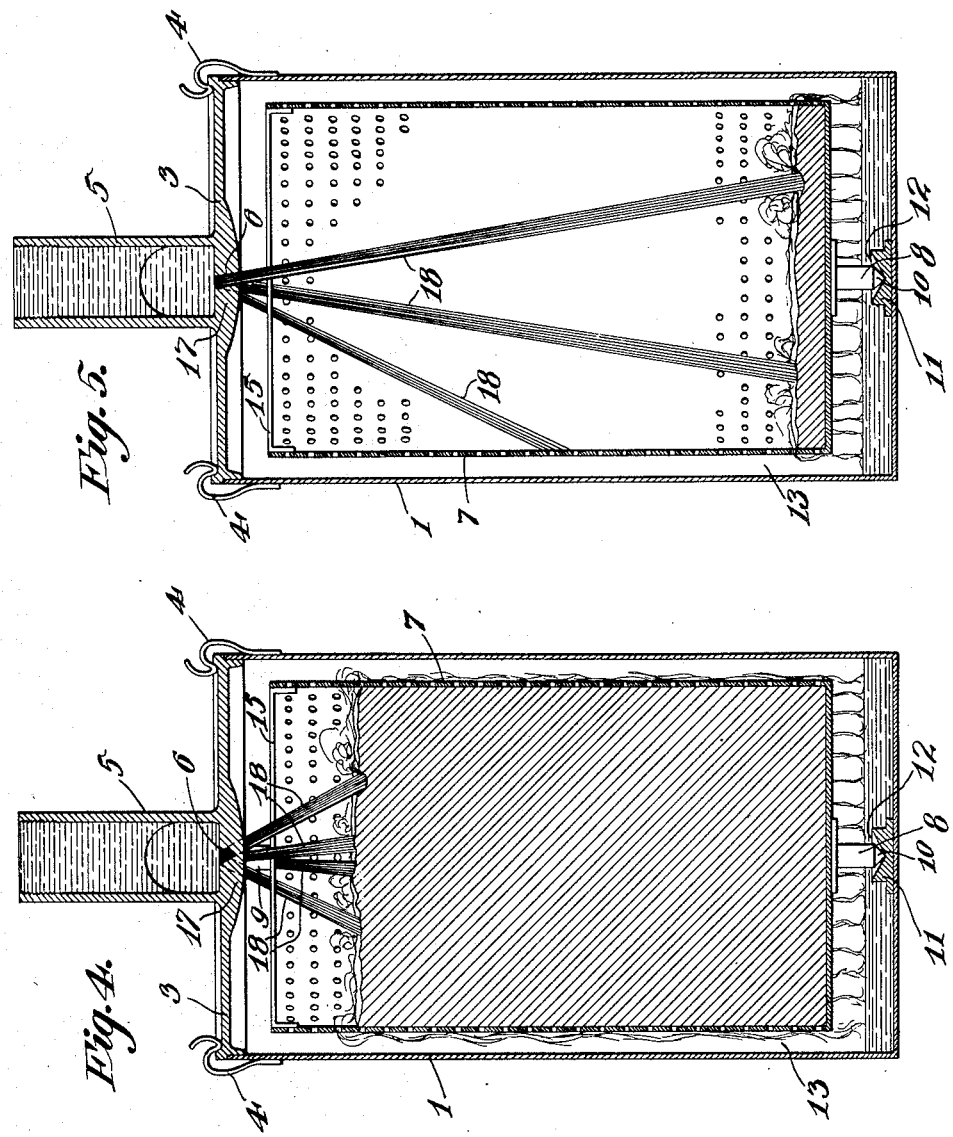
WITNESSES:
Virgil L. Mares
George A. Gruss
INVENTOR
Norwood R. Solly
BY
Joshua R. H. Potts
HIS ATTORNEY Patented May 25, 1926.

1,586,336

UNITED STATES PATENT OFFICE.

NORWOOD R. SOLLY, OF AUDUBON, NEW JERSEY, ASSIGNOR OF ONE-HALF TO CHARLES B. SOLLY, OF PHILADELPHIA, PENNSYLVANIA.

SOLUTION MIXER.

Application filed December 5, 1924. Serial No. 754,096.

My invention relates to solution mixers especially adapted for mixing soap and water.

The objects are to provide a device of simple and durable construction which will mix a more concentrated solution and which may be quickly taken apart and filled with a substance for making a solution.

Figure 1:
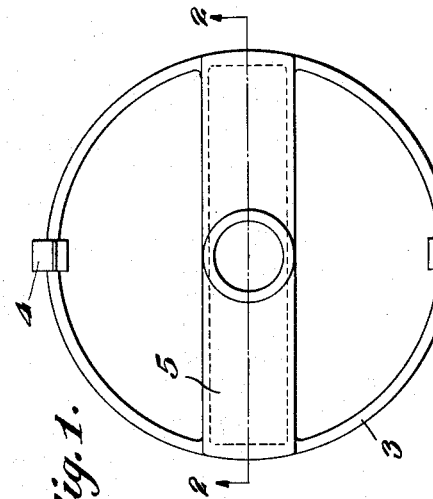
Figure 3:
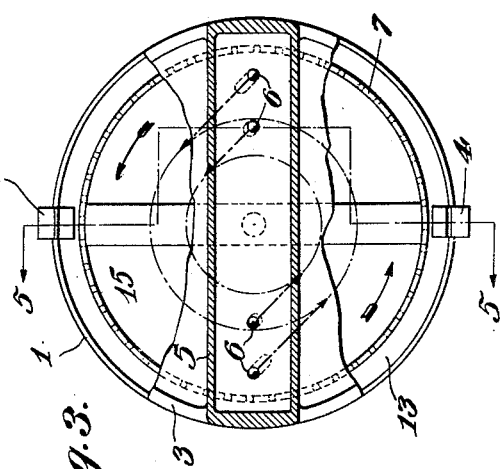
Figure 2:
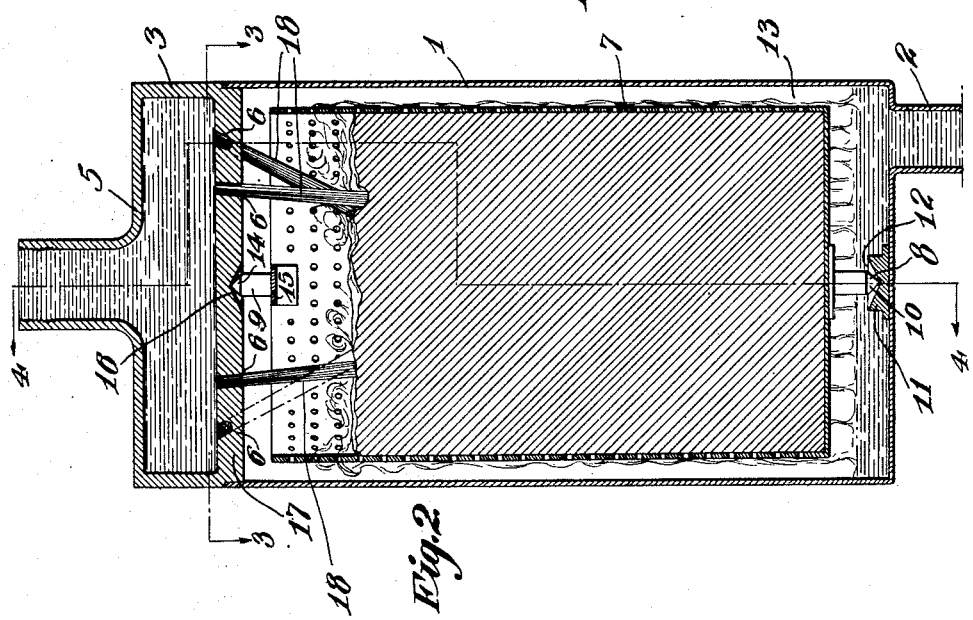

These objects, and other advantageous ends which will be described hereinafter, I attain in the following manner, reference being had to the accompanying drawings in which Figure 1 is a plan view of a solution mixer made in accordance with my invention, Figure 2 a section on line 2—2 of Figure 1, Figure 3 a section on line 3—3 of Figure 2, illustrating certain of the parts broken away, Figure 4 a section on line 4—4 of Figure 2, illustrating the action of the water on the substance for making a solution when the mixer is filled, and Figure 5 a view similar to Figure 4 illustrating the action of the water on the substance when the mixer is nearly empty.

Referring to the drawings, 1 indicates a casing having a solution outlet 2 in its bottom, and open at its top to receive a lid 3 clamped thereto by spring clips 4, 5 a T-shaped conduit, preferably integral with the lid, having discharge openings 6 leading into the casing at an angle to the vertical, 7 a perforated container rotatably mounted in the casing on a pivot 8 at its lower end and a pivot 9 at its upper end. The pivot 8 consists of a pointed pin 10 having its point rotatable in the apex of a conical cup bearing 11. The brim 12 of the cup is of a radius greater than the clearance space 13 between the inner side of the casing and the outer side of the container. The upper pivot 9 consists of a pointed pin 14, mounted on a strip 15 secured to the container at points opposite each other, and taking into conical cup bearing 16, similar to bearing 11, in a thickened part 17 of the lid.

To fill container 7 with soap, or a like substance, lid 3 is removed by manipulating clips 4 and container 7 lifted out of casing 1 by grasping strip 15. After the container is filled, it is slipped into the casing, until the point of pivot pin 8 is in the apex of bearing 11. Lid 3 is then placed on the upper end of the container until pivot pin 14 is in the apex of bearing 16. The confines of bearings 11 and 16 being of a greater radius than the clearance between the casing and the container, assures that the pin will always strike within the cup bearing, and that the container will be centralized within casing when the points of the pins reach the apexes of the bearings.

To mix the soap with a liquid, such as water, conduit 5 is attached to a water pipe in any suitable manner and the water turned on. The water passing through conduit 5 will discharge through its openings 6 in streams 18 which will strike the soap in the container at an angle to the horizontal, thereby causing the container to rotate on its pivots 8 and 9, and constantly bringing a fresh surface of soap to the streams of water, whereby a concentrated solution of soap and water is made. The solution then passes by gravity and centrifugal force out of container 7 through its perforations and into the bottom of the casing, then out through solution outlet 2 into any suitable receptacle.

With a mixer of the construction above set forth, a large quantity of a concentrated solution of soap and water may be quickly mixed, and the mixer may be quickly taken apart for filling.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A solution mixer including a casing provided with an overhead liquid holding chamber; and a perforated container open at its upper end rotatably mounted in the casing below the chamber, there being oblique discharge openings through the bottom of said chamber into said casing to discharge streams of liquid at an angle into said container.

2. A solution mixer including a casing; a lid therefor; a conduit constructed in said lid; and a perforated container open at its upper end rotatably mounted within the casing, there being oblique discharge openings through said conduit into said casing to discharge streams of liquid at an angle into said container.

3. A solution mixer including a casing open at its upper end; a lid closing the upper end of the casing; a conduit integral with the lid and having discharge openings leading into the casing at an angle to the vertical; a perforated container open at its upper end disposed in the casing; a bearing in the bottom of the casing; a pointed pin on the bottom of the container resting in the bearing; a bearing in the under side of the lid, and another pointed pin secured to the top of the container and resting in said bearing.

4. A solution mixer including a casing open at its upper end; a perforated container spaced from the inner side of the casing; a cup-shaped bearing mounted in the bottom of the casing and having a radius greater than the space between the container and the casing; a pointed pin secured to the bottom of the container and resting in the cup-shaped bearing; a lid for closing the upper end of the casing; a conduit on the lid having its discharge openings leading into the container at an angle to the vertical, and means for pivoting the upper end of the container to the lid.

In testimony whereof I have signed my name to this specification.

NORWOOD R. SOLLY.